(12) United States Patent
Hashimoto et al.

(10) Patent No.: US 9,121,415 B2
(45) Date of Patent: Sep. 1, 2015

(54) LINK MECHANISM, AND VARIABLE TURBINE VANE DRIVING UNIT HAVING THE SAME

(75) Inventors: Shinya Hashimoto, Tokyo (JP); Takuro Kameda, Tokyo (JP)

(73) Assignee: MITSUBISHI HITACHI POWER SYSTEMS, LTD., Yokohama-shi (JP)

(*) Notice: Subject to any disclaimer, the term of this patent is extended or adjusted under 35 U.S.C. 154(b) by 605 days.

(21) Appl. No.: 13/562,994

(22) Filed: Jul. 31, 2012

(65) Prior Publication Data

US 2013/0115056 A1    May 9, 2013

(30) Foreign Application Priority Data

Nov. 4, 2011    (JP) .................................. 2011-242143

(51) Int. Cl.
| | | |
|---|---|---|
| F01D 17/16 | (2006.01) | |
| F04D 29/56 | (2006.01) | |
| F16H 21/44 | (2006.01) | |
| F04D 29/64 | (2006.01) | |

(52) U.S. Cl.
CPC ............ F04D 29/563 (2013.01); F01D 17/162 (2013.01); F04D 29/644 (2013.01); F16H 21/44 (2013.01); F05D 2230/64 (2013.01); F05D 2230/70 (2013.01); F05D 2260/30 (2013.01); Y10T 74/18208 (2015.01)

(58) Field of Classification Search
CPC ....... F01D 17/162; F01D 17/16; F01D 17/12; F01D 17/10; F01D 17/00; F04D 29/563; F04D 29/56
See application file for complete search history.

(56) References Cited

U.S. PATENT DOCUMENTS

| | | | |
|---|---|---|---|
| 5,593,275 A | 1/1997 | Venkatasubbu et al. | |
| 2011/0211941 A1* | 9/2011 | Hirokawa et al. ............. | 415/148 |

FOREIGN PATENT DOCUMENTS

| | | |
|---|---|---|
| EP | 0 545 656 A1 | 6/1993 |
| EP | 1887188 B1 | 9/2009 |
| FR | 2966530 B1 | 11/2012 |
| GB | 2 402 179 A | 12/2004 |
| JP | 04-062399 U | 5/1992 |
| JP | 06-012838 U | 2/1994 |
| JP | 11-138312 A | 5/1999 |

(Continued)

OTHER PUBLICATIONS

International Search Report of PCT/JP2012/069329, mailed Oct. 23, 2012.

(Continued)

*Primary Examiner* — Richard Edgar
(74) *Attorney, Agent, or Firm* — Westerman, Hattori, Daniels & Adrian, LLP

(57) ABSTRACT

A link mechanism includes a rotary shaft having a pin pushing thread hole, a link member having a shaft insertion hole, a detent pin configured to restrict the link member to be relatively non-rotatable with respect to the proximal end of the rotary shaft around an axis thereof, a pin support member to which the detent pin is fixed, and a pushing bolt having a male thread section that can be thread-engaged with the pin pushing thread hole, wherein a pin hole into which the detent pin can be fitted is formed in the proximal end of the rotary shaft and the link member, a pin removing thread hole is formed in the pin support member, and a thread major diameter of the pin removing thread hole is larger than a thread major diameter of the male thread section of the pushing bolt.

6 Claims, 10 Drawing Sheets

(56) References Cited

FOREIGN PATENT DOCUMENTS

| | | |
|---|---|---|
| JP | 2000-320498 A | 11/2000 |
| JP | 2010-196550 A | 9/2010 |
| KR | 20-0464446 Y1 | 1/2013 |

OTHER PUBLICATIONS

Written Opinion of PCT/JP2012/069329, mailed Oct. 23, 2012.

Office Action dated Dec. 2, 2014, issued in corresponding Chinese Patent Application No. 201280047189.9, with Partial English Translation (7 pages).

Notice of Allowance dated Dec. 4, 2014, issued in corresponding Korean Patent Application No. 10-2014-7007647, with English Translation (4 pages).

Extended European Search Report dated Mar. 9, 2015, issued in corresponding European Patent Application No. 12846240.5 (6 pages).

* cited by examiner

LINK MECHANISM, AND VARIABLE TURBINE VANE DRIVING UNIT HAVING THE SAME

TECHNICAL FIELD

The present invention relates to a link mechanism configured to rotate a second member around an axis in connection with movement of a first member, and a variable vane drive device having the same.

This application claims priority to and the benefit of Japanese Patent Application No. 2011-242143 filed on Nov. 4, 2011, the disclosures of which are incorporated by reference herein.

BACKGROUND ART

In a gas turbine or a turbo freezing machine, an axial-flow compressor, which is one type of axial-flow fluid machinery, is used to compress a gas. Such a type of axial-flow fluid machinery sometimes includes a plurality of variable vanes disposed around a rotor in an annular shape, and a variable vane drive device configured to change directions of the variable vanes.

For example, as disclosed in the following Patent Document 1, the variable vane drive device includes a movable ring disposed at an outer circumferential side of a casing and having an annular shape, a ring support mechanism configured to rotatably support the movable ring, an actuator configured to rotate the movable ring, and a link mechanism configured to connect the movable ring to the variable vane such that the direction of the variable vane is varied by rotation of the movable ring.

The link mechanism includes a rotary shaft fixed to the variable vane to form a cylindrical shape around the axis of the variable vane, a link member having a shaft insertion hole through which an end portion of the rotary shaft passes, and a detent pin configured to restrict the link member to be relatively non-rotatable with respect to the rotary shaft. A pin hole into which the detent pin can be fitted is formed from an end portion of the rotary shaft to the link member into which the end portion is inserted, and recessed in a direction perpendicular to the axis of the rotary shaft. The detent pin and the pin hole form an interference fit.

RELATED ART DOCUMENT

Patent Document

Patent Document 1: Japanese Patent Application, First Publication No. 2010-196550

SUMMARY OF THE INVENTION

Problems to be Solved by the Invention

However, in the technique disclosed in Patent Document 1, since an insertion and removing direction of the detent pin is a direction perpendicular to the axis of the rotary shaft, a relatively large working space in that direction is needed. However, since the link mechanisms of the other variable vanes are adjacent to each other in that direction, it is difficult to secure a sufficient working space.

Further, in the technique disclosed in Patent Document 1, the detent pin and the pin hole form an interference fit. For this reason, when the detent pin is fitted into the pin hole such that the link member is relatively non-rotatable with respect to the rotary shaft, there is a need to push the detent pin into the pin hole with a large force. In addition, when the link member is separated from the rotary shaft due to a repair or inspection, there is a need to remove the detent pin from the pin hole with a large force. For this reason, it is difficult to perform an insertion and removing operation of the detent pin with respect to the pin hole regardless of the above-mentioned working space.

That is, in the technique disclosed in Patent Document 1, an operation for assembly and disassembly of the link mechanism is difficult.

It is an object of the present invention to provide a link mechanism capable of facilitating an operation for assembly and disassembly and reducing an operation time for assembly and disassembly, and a variable vane drive device having the same.

Means for Solving the Problems (1) The present invention provides a link mechanism configured to rotate a second member around an axis of the second member in connection with movement of a first member, the link mechanism including: a rotary shaft formed in a cylindrical shape around the axis and having a distal end fixed to the second member and a pin pushing thread hole recessed from a proximal end of the rotary shaft to the distal end in a direction parallel to the axis; a link member having a shaft insertion hole which passes in a direction parallel to the axis and through which the proximal end of the rotary shaft can be inserted; a detent pin configured to restrict the link member to be relatively non-rotatable around the axis with respect to the proximal end of the rotary shaft; a pin support member to which the detent pin is fixed; and a pushing bolt having a male thread section that can be thread-engaged with the pin pushing thread hole of the rotary shaft, wherein a pin hole, which is formed from the proximal end of the rotary shaft to the link member, which is recessed toward the distal end in a direction parallel to the axis, and into which the detent pin can be fitted, is formed at the proximal end of the rotary shaft and the link member into which the proximal end is inserted, a pin removing thread hole passing in a direction in which the detent pin fixed to the pin support member extends, and concentric with the pin pushing thread hole of the rotary shaft when the detent pin is fitted into the pin hole, is formed in the pin support member, and a thread major diameter of the pin removing thread hole is larger than a thread major diameter of the male thread section of the pushing bolt and smaller than an outer diameter of a bolt head section of the pushing bolt.

(2) The link mechanism may include a removing bolt having a male thread section that can be thread-engaged with the pin removing thread hole.

In the link mechanism, when the link member is attached to the rotary shaft, first, the link member is mounted on the proximal end of the rotary shaft. Specifically, the proximal end of the rotary shaft is inserted into the shaft insertion hole of the link member. Next, the male thread section of the pushing bolt is inserted into the pin removing thread hole of the pin support member to which the detent pin is fixed, and then the male thread section of the pushing bolt is threaded into the pin pushing thread hole of the rotary shaft. As a result, the pin support member is pushed by the bolt head section of the pushing bolt in an axial direction so as to gradually approach the rotary shaft and the link member, and the detent pin fixed to the pin support member is gradually fitted into the pin hole.

Meanwhile, in the link mechanism, when the link member is separated from the rotary shaft, the male thread section of the removing bolt is threaded into the pin removing thread hole of the pin support member. Since the thread major diameter of the pin removing thread hole is larger than the thread major diameter of the male thread section of the pushing bolt and a thread minor diameter of the removing bolt is larger than a minor diameter of the pin pushing thread hole of the link member, the removing bolt cannot enter the pin pushing thread hole of the link member.

When the removing bolt is threaded into the pin removing thread hole of the pin support member, a front end of the removing bolt is brought into contact with a surface of the link member. After that, further, the removing bolt is threaded into the pin removing thread hole of the pin support member. As described above, the removing bolt cannot enter the pin pushing thread hole of the link member. For this reason, the removing bolt maintains a state in which the front end is in contact with the surface of the link member, and increases a protrusion amount from the pin support member. As a result, the pin support member with which the removing bolt is thread-engaged as well as the detent pin fixed to the pin support member is spaced apart from the second member in the axial direction, and the detent pin is removed from the pin hole. Then, the link member is separated from the rotary shaft.

As described above, in the link mechanism, since an insertion and removing direction of the detent pin is the axial direction, i.e., a direction in which the rotary shaft extends, and an attachment and removal direction of the link member with respect to the rotary shaft, an insertion and removing operation of the detent pin can be performed in a space in which a working space for attachment and removal of the link member is secured. For this reason, in the link mechanism, upon the insertion and removing operation of the detent pin of the link mechanism, there is no interference with the other neighboring link mechanisms.

Accordingly, according to the link mechanism, a working space sufficient for the insertion and removing operation of the detent pin can be secured.

In addition, in the link mechanism, the detent pin can be fitted into the pin hole by threading the pushing bolt. Further, in the link mechanism, as the removing bolt is threaded into the pin support member, the detent pin can be removed from the pin hole without using a jack or the like. For this reason, in the link mechanism, the insertion and removing operation of the detent pin with respect to the pin hole can be easily performed.

Accordingly, according to the link mechanism, an assembly and disassembly operation can be easily performed in a short period of time.

In addition, in the link mechanism, since the pin hole is formed in a direction parallel to the axis, i.e., a direction in which the rotary shaft extends, when the thickness of the link member is increased and the depth of the pin hole is increased, a contact area of the detent pin with the rotary shaft and the link member can be easily increased. For this reason, in the link mechanism, even when a large rotational torque is applied to the link member, damage to the detent pin can be prevented.

(3) The link mechanism may include a plurality of detent pins, and the plurality of detent pins may be fixed to the pin support member on a circumference around an axis of the pin removing thread hole in a circumferential direction at regular intervals.

In the link mechanism, the respective detent pins can be evenly fitted into the pin holes.

(4) The axis of the pin pushing thread hole may be disposed over the axis of the rotary shaft.

In the link mechanism, the link member can be evenly pushed toward the second member by the pushing bolt centering around the rotary shaft.

(5) The pin attachment hole passing in a penetration direction of the pin removing thread hole is formed in the pin support member, and the detent pin may have a male thread section formed at one end side of the detent pin, a fitting section formed at the other end of the detent pin and fitted into the pin hole, and a collar section formed at a boundary between the male thread section and the fitting section and projecting in a direction perpendicular to an axis of the detent pin.

In the link mechanism, the detent pin can be easily fixed to the pin support member, and the fixed detent pin can be easily separated therefrom.

(6) The present invention provides a variable vane drive device of axial-flow fluid machinery including a rotor having a plurality of blades, a casing configured to rotatably cover the rotor, and a plurality of variable vanes disposed around the rotor in the casing in an annular shape, the variable vane drive device of the axial-flow fluid machinery including: an annular-shaped movable ring disposed at an outer circumferential side of the casing; a plurality of ring support mechanisms disposed in a circumferential direction of the movable ring at predetermined intervals and configured to rotatably support the movable ring around the rotor; a rotary drive mechanism configured to rotate the movable ring around the rotor; and the link mechanism, wherein the link mechanism is configured to connect the movable ring to the variable vane such that a direction of the variable vane, which is the second member, is varied according to rotation of the movable ring, which is the first member.

Since the variable vane drive device also includes the link mechanism, a working space sufficient for the insertion and removing operation of the detent pin can be secured, and the insertion and removing operation of the detent pin with respect to the pin hole can be easily performed. Accordingly, even in the variable vane drive device, the assembly and disassembly operation of the link mechanism can be easily performed in a short period of time.

Effects of the Invention

According to the present invention, a working space sufficient for an insertion and removing operation of the detent pin can be secured, and the insertion and removing operation of the detent pin with respect to the pin hole can be easily performed.

Accordingly, according to the present invention, the assembly and disassembly operation can be easily performed in a short period of time.

In addition, in the present invention, since the pin hole is formed in a direction parallel to the axis, i.e., a direction in which the rotary shaft extends, when the thickness of the link member is increased and the depth of the pin hole is increased, the contact area of the detent pin with the rotary shaft and the link member can be easily increased. For this reason, according to the present invention, even when a large rotational torque is applied to the link member, damage to the detent pin can be prevented.

MODES FOR CARRYING OUT THE INVENTION

Hereinafter, an embodiment of an axial-flow fluid machine according to the present invention will be described with reference to the accompanying drawings.

Figure 1:
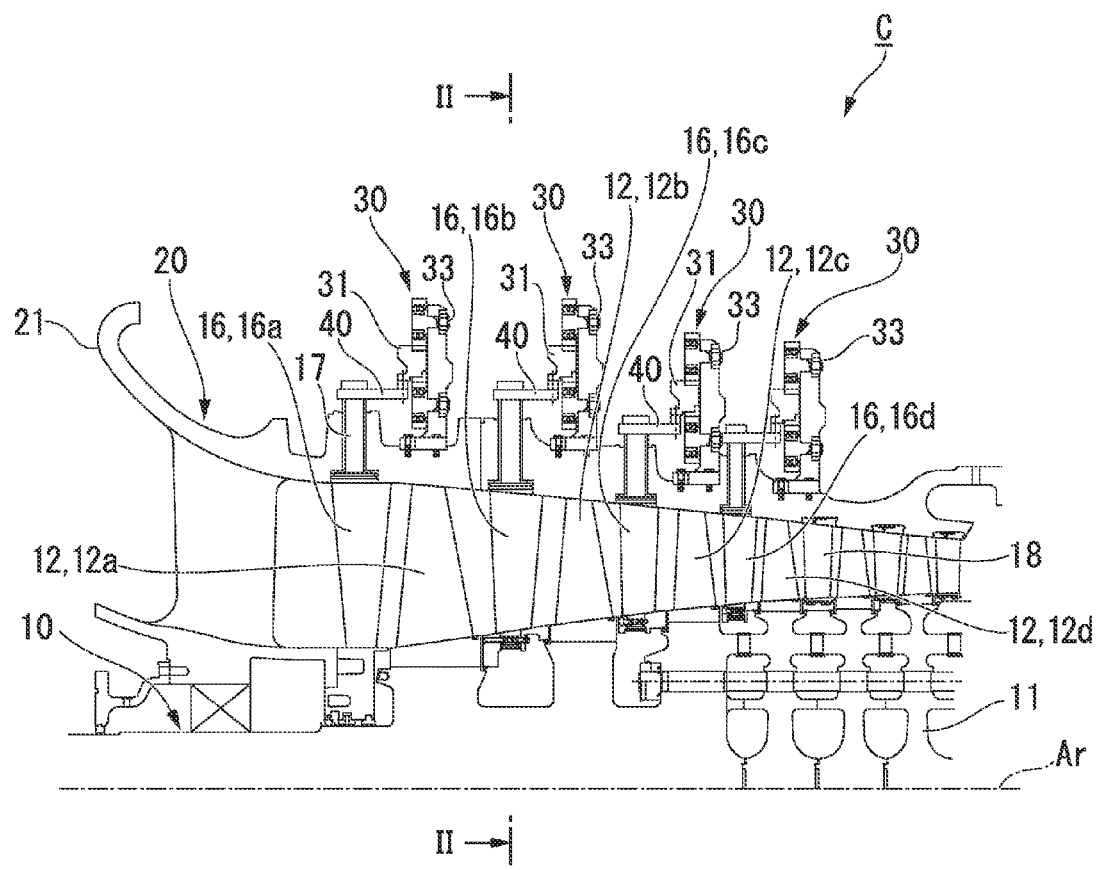
FIG. 1 is a cut-out side view of major parts of an axial-flow compressor according to an embodiment of the present invention.

As shown in FIG. 1, the axial-flow fluid machine of the embodiment is an axial-flow compressor C, and includes a rotor 10 having a plurality of blades 12, a casing 20 configured to rotatably cover the rotor 10, and a plurality of vanes 16 and 18 disposed around the rotor 10 in an annular shape.

The rotor 10 includes a rotor main body 11 configured by stacking a plurality of rotor discs, and the plurality of blades 12 extending from the plurality of rotor discs respectively in a radial direction. That is, the rotor 10 has a multi-stage blade structure. The rotor 10 is rotatably supported by the casing 20 around an axis of the rotor main body 11 (hereinafter referred to as a rotor axis Ar).

A suction port 21 configured to suction external air is formed on one side of the casing 20 in a direction of the rotor axis Ar, and an ejection port (not shown) configured to eject a compressed gas is formed on the other side.

Among the plurality of blades 12, the plurality of blades 12 fixed to the rotor discs nearest the suction port 21 side forms a first blade stage 12a. The plurality of blades 12 near the ejection port side of the first blade stage 12a forms a second blade stage 12b. Subsequently, the plurality of remaining blades 12 forms a third blade stage 12c, a fourth blade stage 12d and the like toward the ejection port side.

The plurality of vanes 16 and 18 is disposed at the suction port 21 side of each of the blade stages 12a, 12b and the like around the rotor main body 11 in an annular shape. Here, the plurality of vanes 16 disposed at the suction port 21 side of the first blade stage 12a forms a first vane stage 16a. The plurality of vanes 16 disposed at the suction port 21 side of the second blade stage 12b forms a second vane stage 16b. Subsequently, the plurality of vanes 16 disposed at the suction port 21 side of the respective blade stages 12c, 12d and the like forms a third vane stage 16c, a fourth vane stage 16d and the like.

In this embodiment, among the respective vane stages, the respective vanes 16 constituting the first vane stage 16a to the fourth vane stage 16d constitute the variable vanes, and the vanes 18 constituting a fifth or later stage constitute fixed vanes.

Each of the variable vanes 16 has a blade axis extending in the radial direction with reference to the rotor main body 11, and is rotatably attached to the casing 20 around the blade axis.

The axial-flow compressor C of the embodiment includes a variable vane drive device 30 of each of the variable vane stages 16a to 16d to vary a direction of the variable vane 16 of each of the variable vane stages 16a to 16d.

Figure 2:
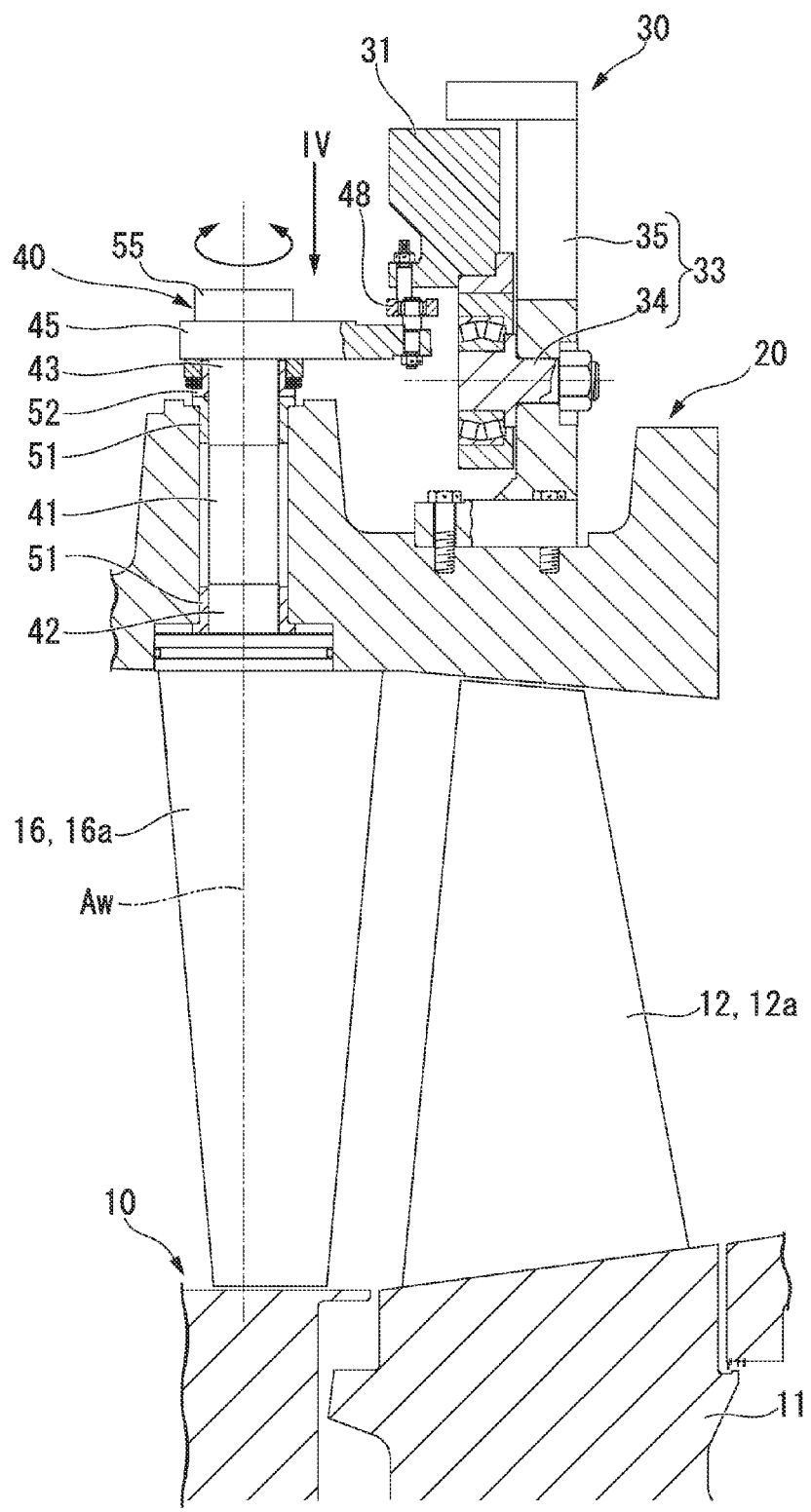
FIG. 2 is a cross-sectional view taken along line II-II of FIG. 1, showing major parts of a variable vane drive device.
Figure 3:
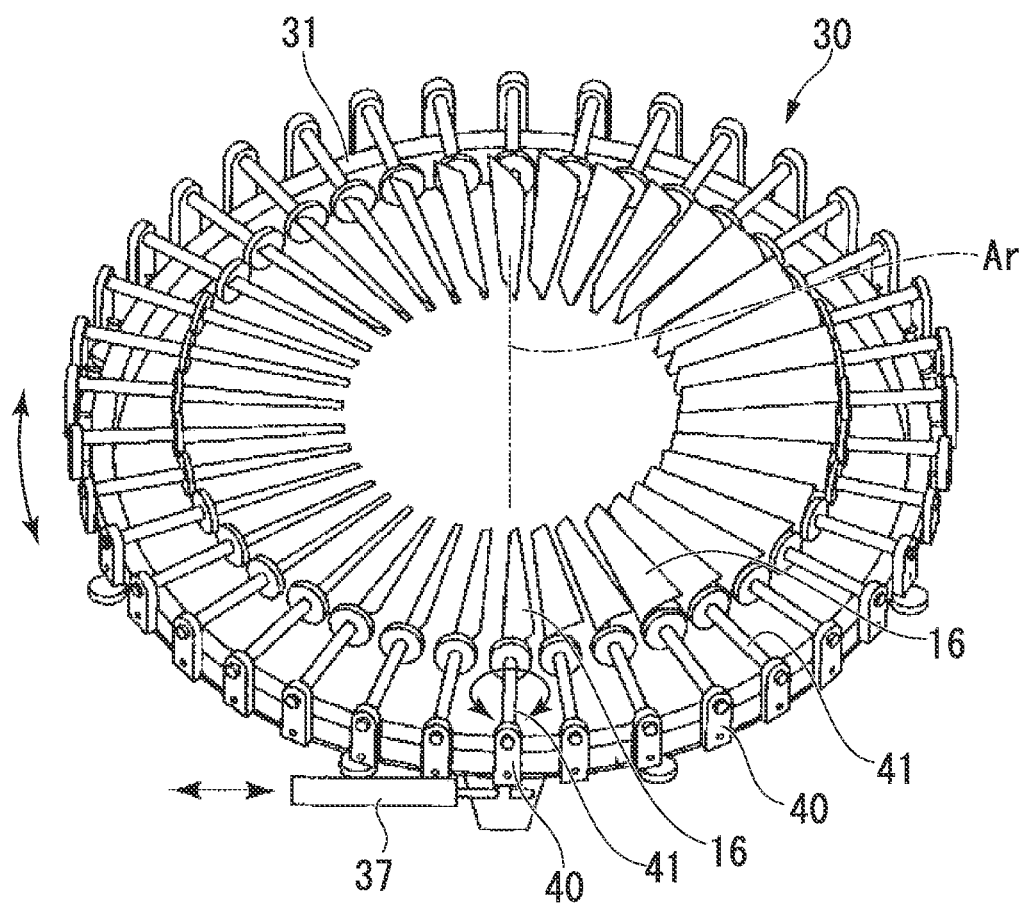
FIG. 3 is a perspective view of the variable vane drive device shown in FIG. 2.

As shown in FIGS. 2 and 3, each of the variable vane drive devices 30 includes a movable ring 31 (a first member) disposed at an outer circumferential side of the casing 20 and having an annular shape, a plurality of ring support mechanisms 33 disposed in a circumferential direction of the movable ring 31 at intervals and rotatably supporting the movable ring 31 around a rotor axis Ar (shown in FIG. 3), a rotary drive mechanism 37 (not shown) configured to rotate the movable ring 31 around the rotor axis Ar, and a link mechanism 40 configured to connect the movable ring 31 to the variable vane 16 such that a direction of the variable vane 16 (a second member) is varied by rotation of the movable ring 31.

As shown in FIG. 2, the ring support mechanism 33 has a roller 34 in roll contact with the movable ring 31, and a support 35 configured to rotatably support the roller 34.

Figure 4:
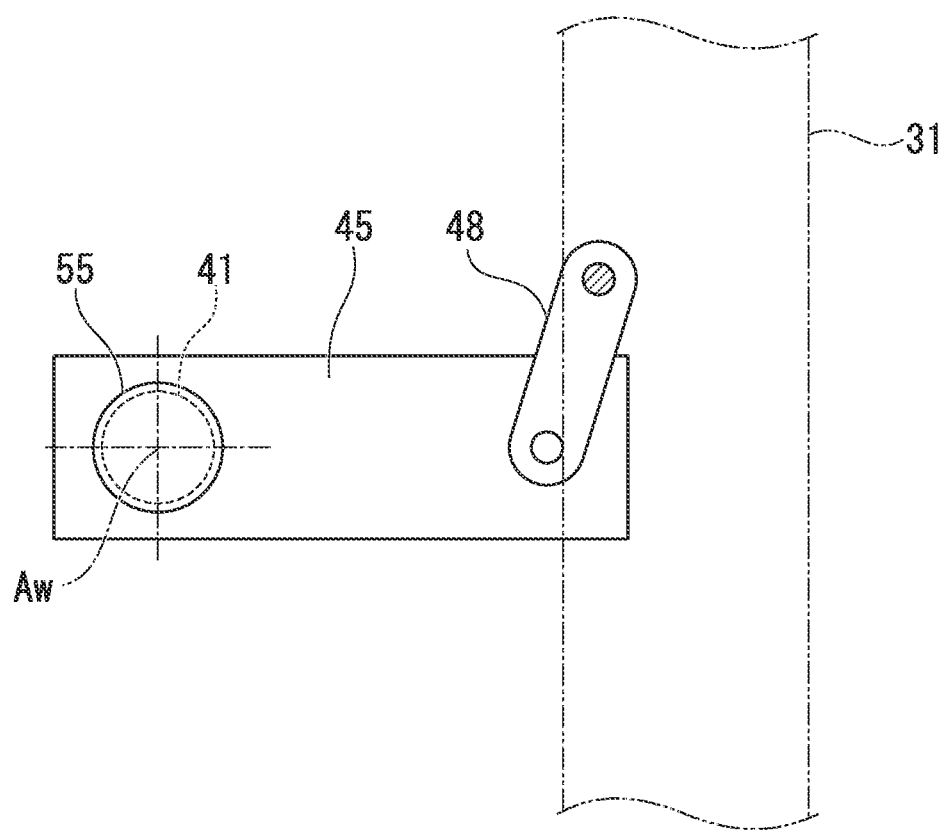
FIG. 4 is a view when seen from an arrow IV of FIG. 2.

In addition, as shown in FIGS. 2 and 4, the link mechanism 40 includes a blade rotating shaft 41 formed in a cylindrical shape around a blade axis Aw of the variable vane 16 and having a distal end 42 fixed to an outer end of the variable vane 16, a first link piece (a link member) 45 relatively non-rotatably attached to a proximal end 43 of the blade rotating shaft 41, and a second link piece 48 having one end portion connected to the first link piece 45 by a pin and the other end portion connected to the movable ring 31 by a pin.

The blade rotating shaft 41 passes through the casing 20, has the distal end 42 disposed at an inner circumferential side of the casing 20, and as described above, is fixed to an outer end of the variable vane 16. In addition, the proximal end 43 of the blade rotating shaft 41 is disposed at the outer circumferential side of the casing 20, and as described above, the first link piece 45 is attached to the proximal end 43. The blade rotating shaft 41 is rotatably supported with respect to the casing 20 around the blade axis Aw by a casing side bush 51 installed at the casing 20.

Figure 6A:
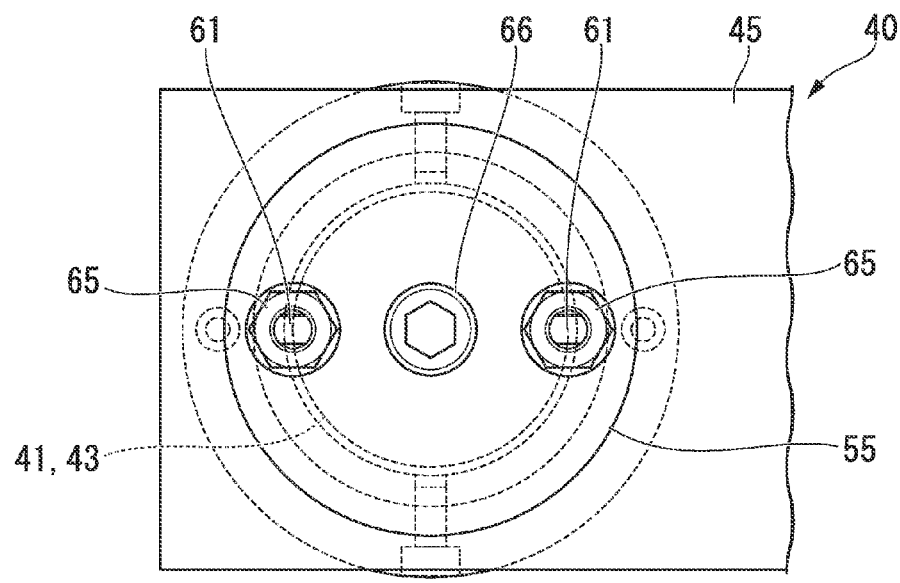
FIG. 6A is a plan view of the link mechanism, showing a state in which the detent pin is fitted during the attachment process of the first link piece to the blade rotating shaft.
Figure 6B:
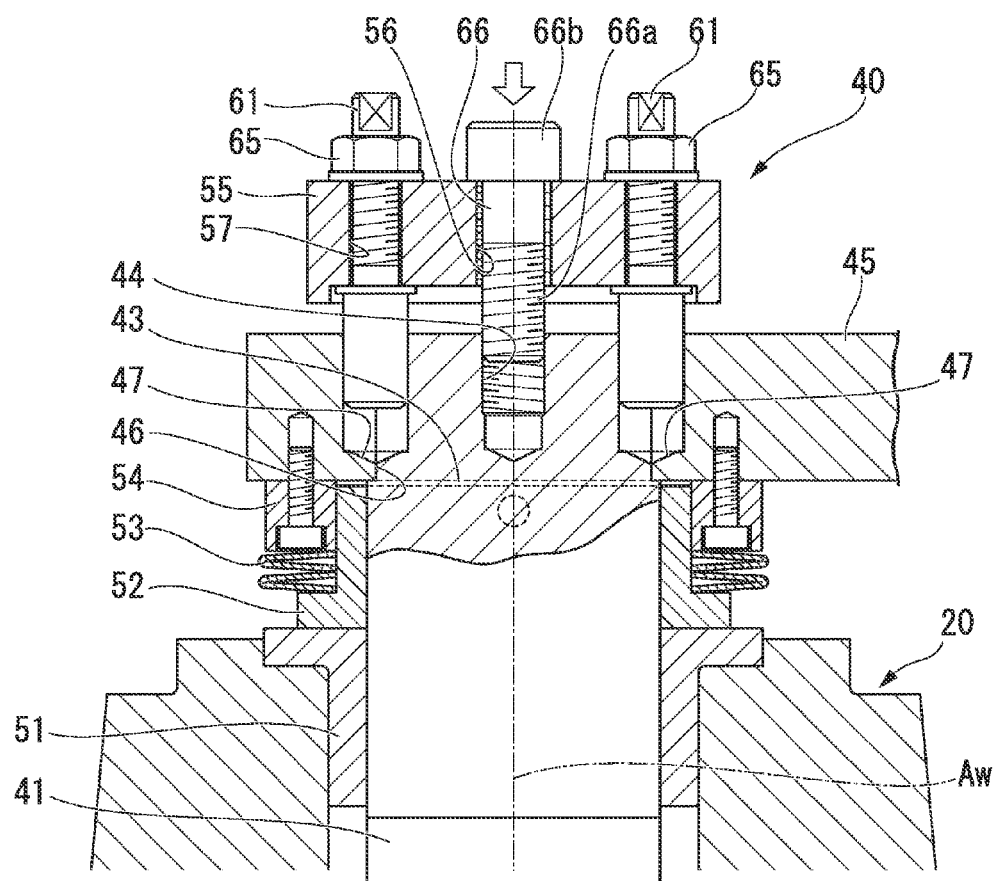
FIG. 6B is a cross-sectional view of the link mechanism in the state shown in FIG. 6A.

As shown in FIGS. 6A and 6B, the link mechanism 40 includes two detent pins 61 configured to restrict the first link piece 45 to be relatively non-rotatable with respect to the blade rotating shaft 41 around the blade axis Aw, a pin support member 55 to which the two detent pins 61 are fixed, and a pushing bolt 66 configured to push the two detent pins 61 into a pin hole 47 (described later).

A shaft insertion hole 46 into which the proximal end 43 of the blade rotating shaft 41 can be inserted is formed at the first link piece 45. In the shaft insertion hole 46, when the blade rotating shaft 41 is inserted into the shaft insertion hole 46, an axis of the shaft insertion hole 46 is disposed over the blade axis Aw. In the first link piece 45, an annular-shaped spring shoe 54 having an inner diameter larger than an inner diameter of the shaft insertion hole 46 is fixed to one outer surface of outer surfaces opposite to each other in an axial direction of the shaft insertion hole 46 to be concentric with the axis of the shaft insertion hole 46.

The pin hole 47 into which the detent pin 61 can be fitted is formed at the proximal end 43 of the first link piece 45 and the blade rotating shaft 41. The pin hole 47 is formed over the first link piece 45 and the blade rotating shaft 41 passing through the shaft insertion hole 46 of the first link piece 45, parallel to the blade axis Aw, and recessed toward the distal end 42 of the blade rotating shaft 41, so that the detent pin 61 can be fitted into the pin hole 47. The respective pin holes 47 corresponding to the two detent pins 61 are formed on the circumference around the blade axis Aw in the circumferential direction at regular intervals. In addition, the pin hole 47 is formed by machining both the first link piece 45 and the blade rotating shaft 41 together in a state in which the proximal end 43 of the blade rotating shaft 41 is inserted into the shaft insertion hole 46 of the first link piece 45 and the first link piece 45 is fixed to a fixture to be relatively non-rotatable with respect to the blade rotating shaft 41.

A pin pushing thread hole 44 with which a male thread section 66a of the pushing bolt 66 can be thread-engaged is formed at the blade rotating shaft 41. The pin pushing thread hole 44 is recessed from the proximal end side to distal end side of the blade rotating shaft 41 and has an axis disposed over the blade axis Aw. A rotary shaft side bush 52 is installed at an outer circumference of the blade rotating shaft 41 to be relatively non-rotatable with respect to the blade rotating shaft 41. A flange section 52f protrudes from the rotary shaft side bush 52 toward the outer circumferential side with reference to the blade rotating shaft 41. An end surface of the flange section 52f forms a sliding contact surface in slide contact with an end surface of a flange section of the casing side bush 51. In addition, a spring 53 configured to bias the spring shoe 54 and the flange section 52f of the rotary shaft side bush 52, which are fixed to the first link piece 45, in a direction of separating the spring shoe 54 and the flange section 52f from each other.

A pin removing thread hole 56 with which a removing bolt 68 (shown in FIGS. 8A and 8B) can be thread-engaged and two pin attachment holes 57 through which the detent pin 61 passes are formed at the pin support member 55. The pin removing thread hole 56 and the two pin attachment holes 57, which are parallel to each other, pass through the pin support member 55. The two pin attachment holes 57 are formed on the circumference around an axis of the pin removing thread hole 56 in the circumferential direction at regular intervals. A diameter of the circumference is equal to a diameter of a circumference around the blade axis Aw on which two pin holes 47 are formed. Accordingly, when the pin support member 55 is disposed such that an axis of the pin removing thread hole 56 is positioned over the blade axis Aw, an axis of each of the pin attachment holes 57 is positioned over the axis of the pin holes 47.

A thread major diameter of the pin removing thread hole 56 is larger than a thread major diameter of the male thread section 66a of the pushing bolt 66, and smaller than an outer diameter of a bolt head section 66b of the pushing bolt 66. Accordingly, the male thread section 66a of the pushing bolt 66 can be inserted into the pin removing thread hole 56, not in contact therewith, and the bolt head section 66b of the pushing bolt 66 cannot be inserted thereinto.

Figure 10:
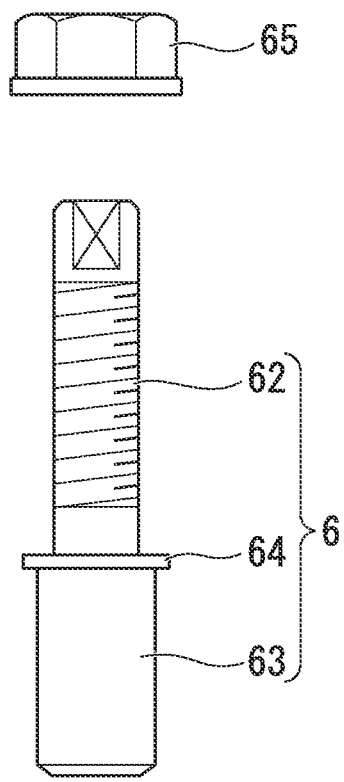
FIG. 10 is a side view of the detent pin and a pin-fixing nut.

As shown in FIGS. 7 and 10, the detent pin 61 includes a male thread section 62 formed at one end thereof, a fitting section 63 formed at the other end and fitted into the pin hole 47, and a collar section 64 formed at a boundary between the male thread section 62 and the fitting section 63 and projecting in a direction perpendicular to the axis of the detent pin 61. The fitting section 63 of the detent pin 61 and the pin hole 47 form an interference fit. That is, the fitting section 63 of the detent pin 61 has an outer diameter slightly larger than an inner diameter of the pin hole 47.

Figure 7A:
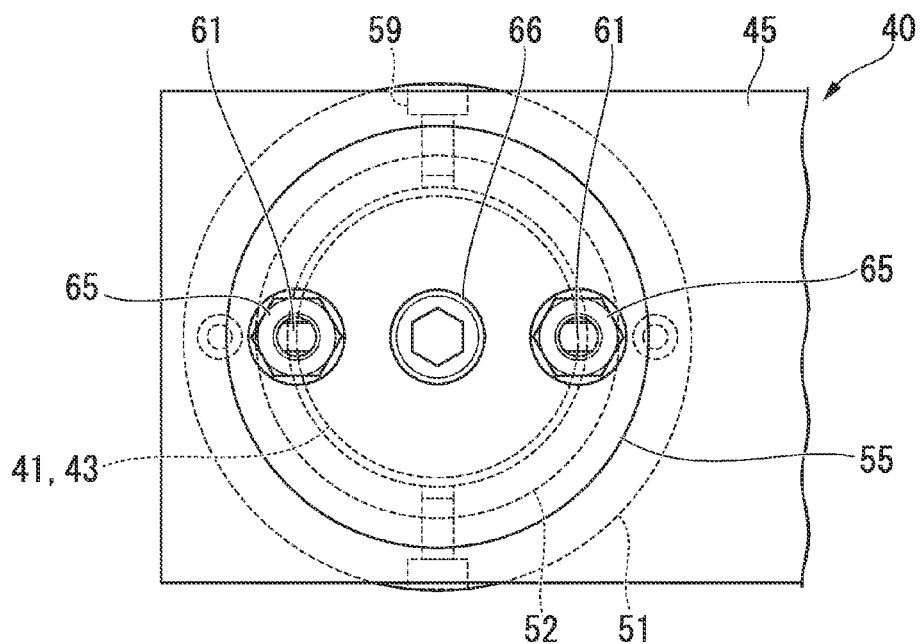
FIG. 7A is a plan view of the link mechanism, showing a state upon completion of attachment of the first link piece to the blade rotating shaft.
Figure 7B:
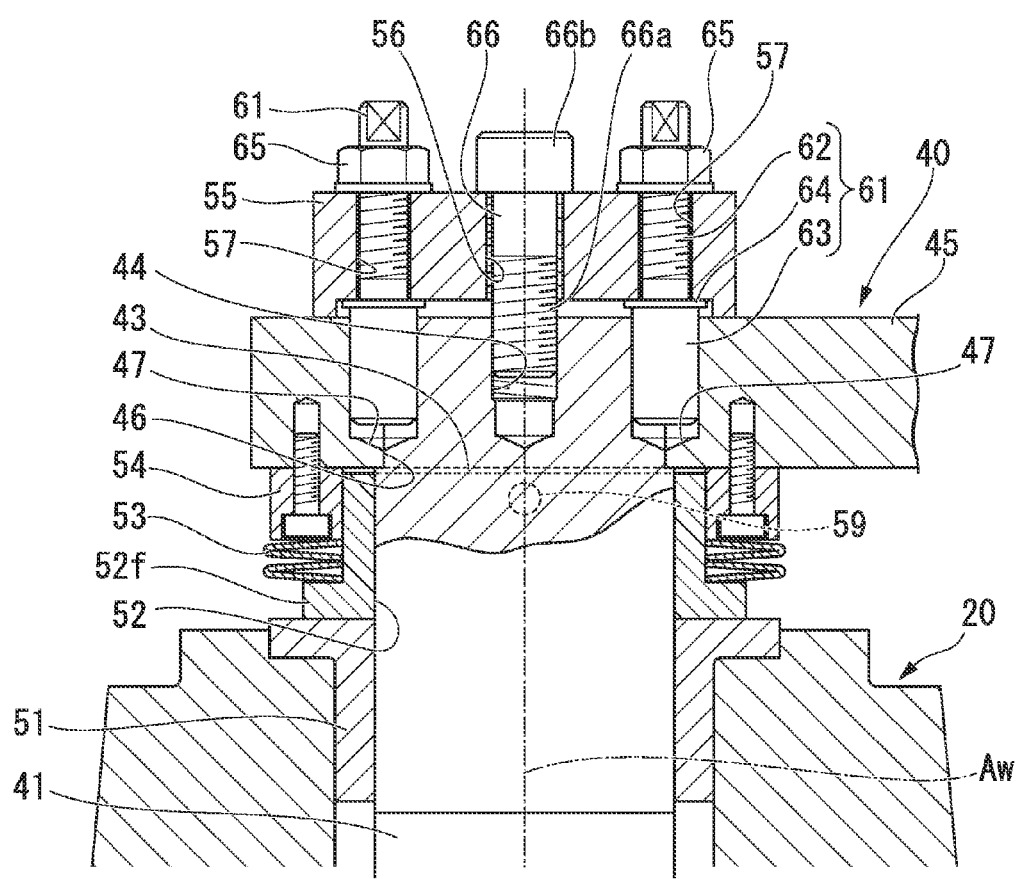
FIG. 7B is a cross-sectional view of the link mechanism in the state shown in FIG. 7A.

As shown in FIGS. 7A and 7B, a portion of the male thread section 62 of the detent pin 61 is inserted into the pin attachment hole 57 of the pin support member 55. Then, a pin-fixing nut 65 is threaded into the male thread section 62 of the detent pin 61. As a result, the pin support member 55 is sandwiched between the pin-fixing nut 65 threaded into the male thread section 62 of the detent pin 61 and the collar section 64 of the detent pin 61 to be relatively immovable with respect to the detent pin 61. In other words, the detent pin 61 is fixed to the pin support member 55.

Next, an assembly of the link mechanism 40 will be sequentially described.

Figure 5A:
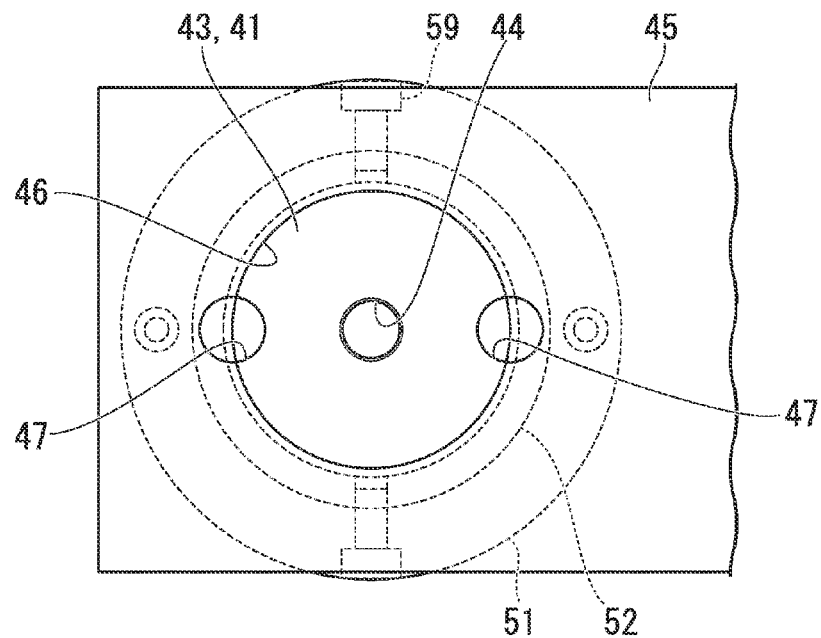
FIG. 5A is a plan view of a link mechanism, showing a state before fitting of a detent pin during an attachment process of a first link piece to a blade rotating shaft.
Figure 5B:
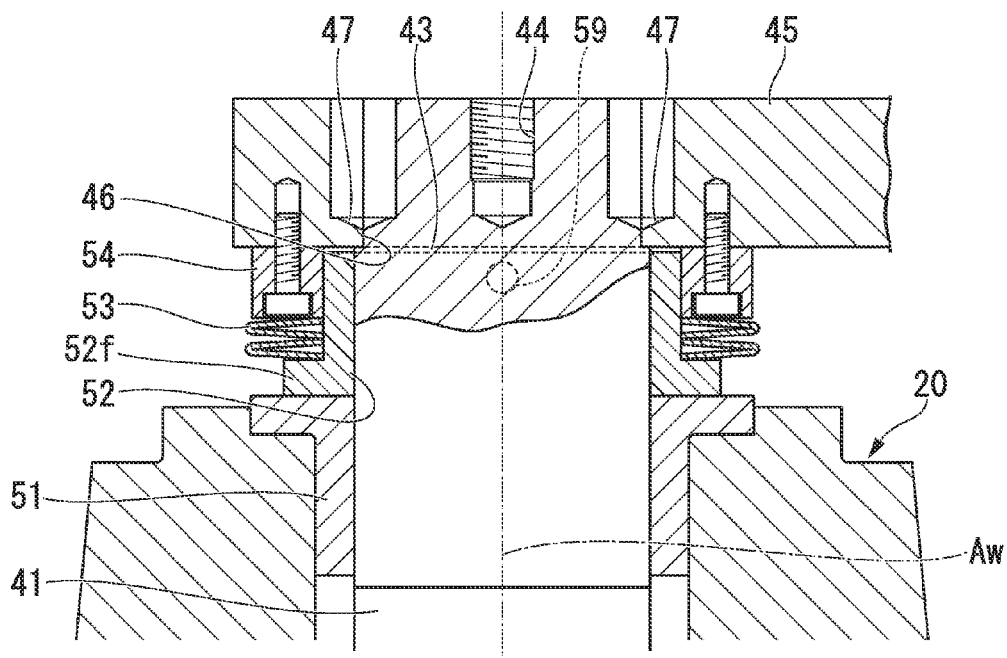
FIG. 5B is a cross-sectional view of the link mechanism in the state shown in FIG. 5A.

First, as shown in FIGS. 5A and 5B, the rotary shaft side bush 52 is attached to the proximal end 43 side of the blade rotating shaft 41. Then, a detent thread 59 is threaded from the outer circumferential side of the rotary shaft side bush 52 toward the inner circumferential side, and restricts the rotary shaft side bush 52 to be relatively non-rotatable with respect to the blade rotating shaft 41. In addition, here, a portion on which the first link piece 45 is mounted remains at an opposite side of the variable vane 16 in a direction of the blade axis Aw with reference to the rotary shaft side bush 52. Next, the spring 53 is disposed at the outer circumferential side of the rotary shaft side bush 52.

Next, the first link piece 45 is mounted on the proximal end 43 of the blade rotating shaft 41. Specifically, the proximal end 43 of the blade rotating shaft 41 is inserted into the shaft insertion hole 46 of the first link piece 45. As a result, the spring 53 is sandwiched between the flange section 52f of the rotary shaft side bush 52 and the spring shoe 54 fixed to the first link piece 45.

Next, as shown in FIGS. 6A and 6B, the male thread section 66a of the pushing bolt 66 is inserted into the pin removing thread hole 56 of the pin support member 55 to which the detent pin 61 is fixed. Here, the male thread section 66a of the pushing bolt 66 is inserted such that the bolt head section 66b of the pushing bolt 66 is disposed at the same side as the pin-fixing nut 65 to fix the detent pin 61 to the pin support member 55 with reference to the pin support member 55. In addition, as described above, since the thread major diameter of the pin removing thread hole 56 is larger than the thread major diameter of the male thread section 66a of the pushing bolt 66, the male thread section 66a of the pushing bolt 66 is not threaded into the pin removing thread hole 56.

Next, a front end of the pushing bolt 66 protruding from the pin support member 55 is positioned to match a position of the pin pushing thread hole 44 of the blade rotating shaft 41 and the pin support member 55 is rotated around the pushing bolt 66, such that the front end of the detent pin 61 fixed to the pin support member 55 coincides with the position of the pin hole 47. Then, the male thread section 66a of the pushing bolt 66 is threaded into the pin pushing thread hole 44 of the blade rotating shaft 41. As a result, the pin support member 55 is pushed by the bolt head section 66b of the pushing bolt 66 to gradually approach the blade rotating shaft 41 and the first link piece 45, and the fitting section 63 of the detent pin 61 fixed to the pin support member 55 is gradually fitted into the pin hole 47.

Here, since the pin pushing thread hole 44 is disposed over the blade rotating shaft 41, the first link piece 45 is evenly-pushed toward the blade rotating shaft 41 by the pushing bolt 66 centering around the blade rotating shaft 41. In addition, since the detent pins 61 are disposed on the circumference around the blade rotating shaft 41 and fixed to the pin support member 55 in the circumferential direction at regular intervals, the detent pins 61 are evenly disposed and fitted into the pin holes 47. For this reason, in this embodiment, the detent pin 61 can be smoothly fitted into the pin hole 47.

When the male thread section 66a of the pushing bolt 66 is threaded into the pin pushing thread hole 44 of the blade rotating shaft 41, as shown in FIGS. 7A and 7B, the pin support member 55 is pushed by the bolt head section 66b of the pushing bolt 66 so as to be brought into contact with the first link piece 45. Then, when the pin support member 55 and the detent pin 61 fixed thereto cannot be moved to distal end side of the blade rotating shaft 41 with respect to the blade rotating shaft 41 and the first link piece 45 in the blade axis (Aw) direction, the threading of the pushing bolt 66 into the pin pushing thread hole 44 is terminated.

As described above, an attachment operation of the first link piece 45 to the blade rotating shaft 41 is terminated.

When the attachment operation of the first link piece 45 is terminated, the one end portion of the second link piece 48 is connected to the first link piece 45 by a pin, and the other end portion is connected to the movable ring 31 by a pin. As described above, an assembly operation of the link mechanism 40 is terminated.

Next, a disassembly operation of the link mechanism 40 will be described.

First, the second link piece 48 is separated from the movable ring 31.

Figure 8A:
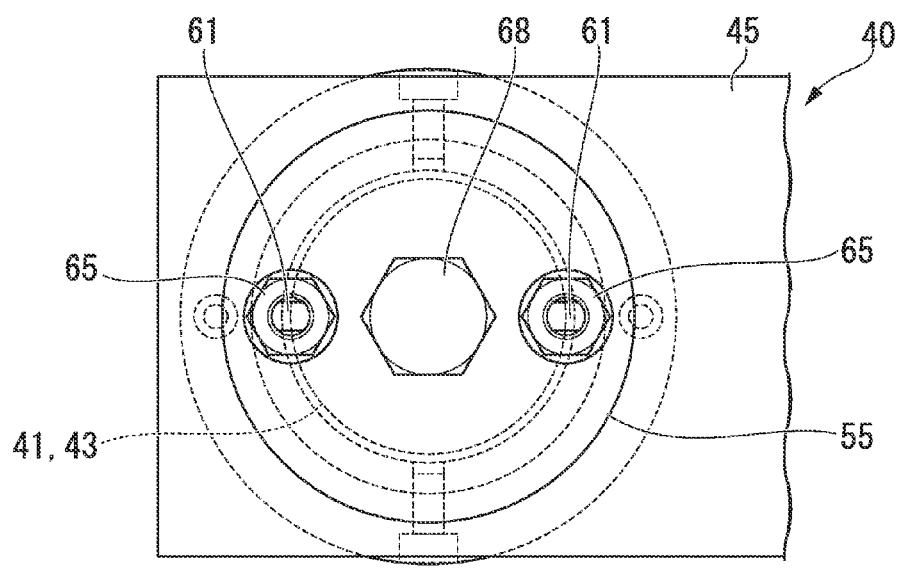
FIG. 8A is a plan view of the link mechanism, showing a state in removing of the detent pin during a removal process of the first link piece from the blade rotating shaft.
Figure 8B:
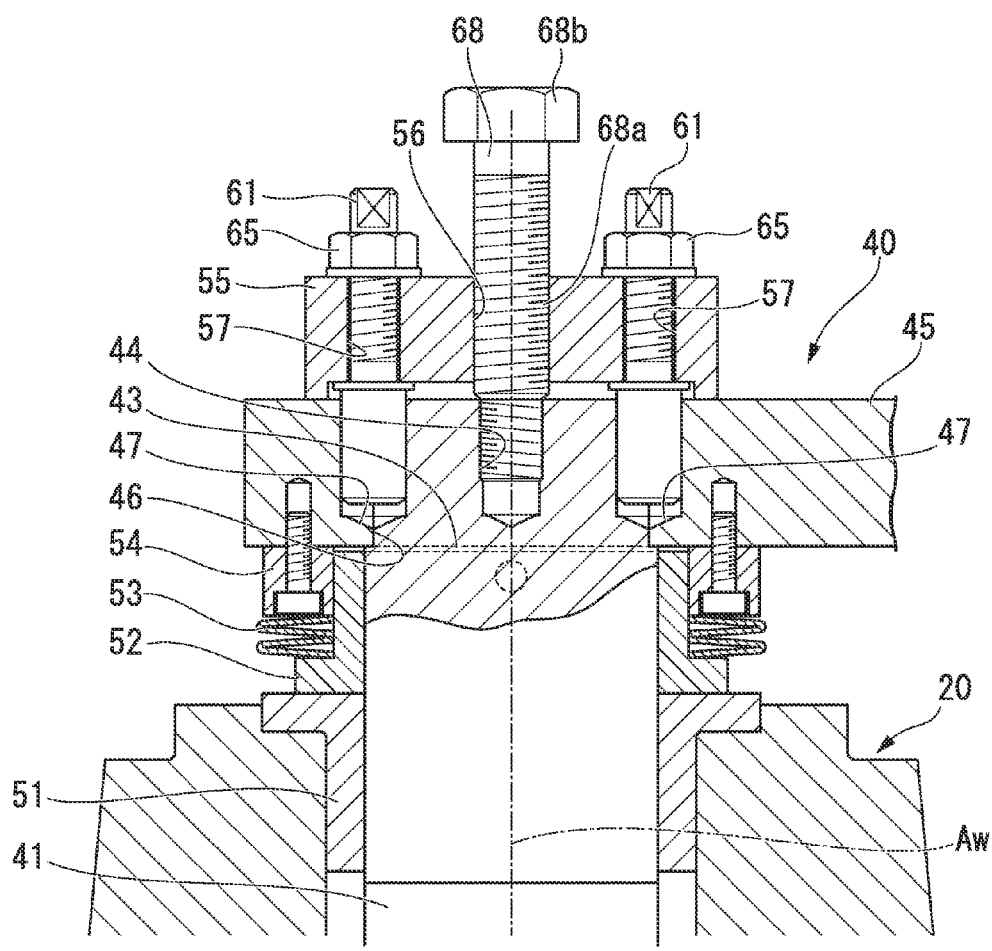
FIG. 8B is a cross-sectional view of the link mechanism in the state shown in FIG. 8A.

Next, as shown in FIGS. 8A and 8B, the removing bolt 68 having a male thread section 68a that can be thread-engaged with the pin removing thread hole 56 of the pin support member 55 is prepared, and the male thread section 68a of the removing bolt 68 is threaded into the pin removing thread hole 56 of the pin support member 55. In addition, as described above, the thread major diameter of the pin removing thread hole 56 is larger than that of the thread major diameter of the male thread section 66a of the pushing bolt 66, and thus, the thread minor diameter of the removing bolt 68 is larger than the minor diameter of the pin pushing thread hole 44 of the first link piece 45. For this reason, the removing bolt 68 cannot enter the pin pushing thread hole 44 of the first link piece 45.

When the removing bolt 68 is threaded into the pin removing thread hole 56 of the pin support member 55, the front end of the removing bolt 68 is brought into contact with a surface of the first link piece 45.

Figure 9A:
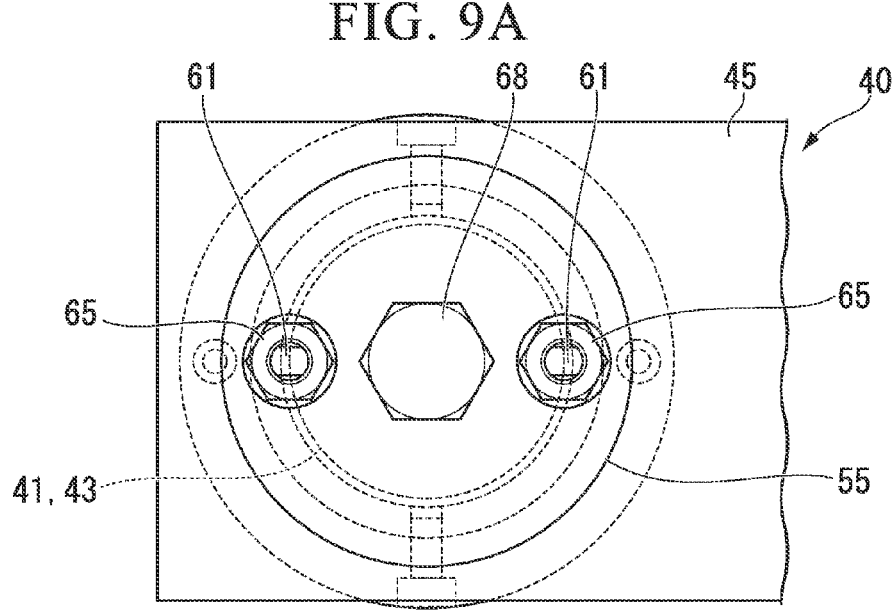
FIG. 9A is a plan view of the link mechanism, showing a state in removing of the detent pin during the removal process of the first link piece from the blade rotating shaft.
Figure 9B:
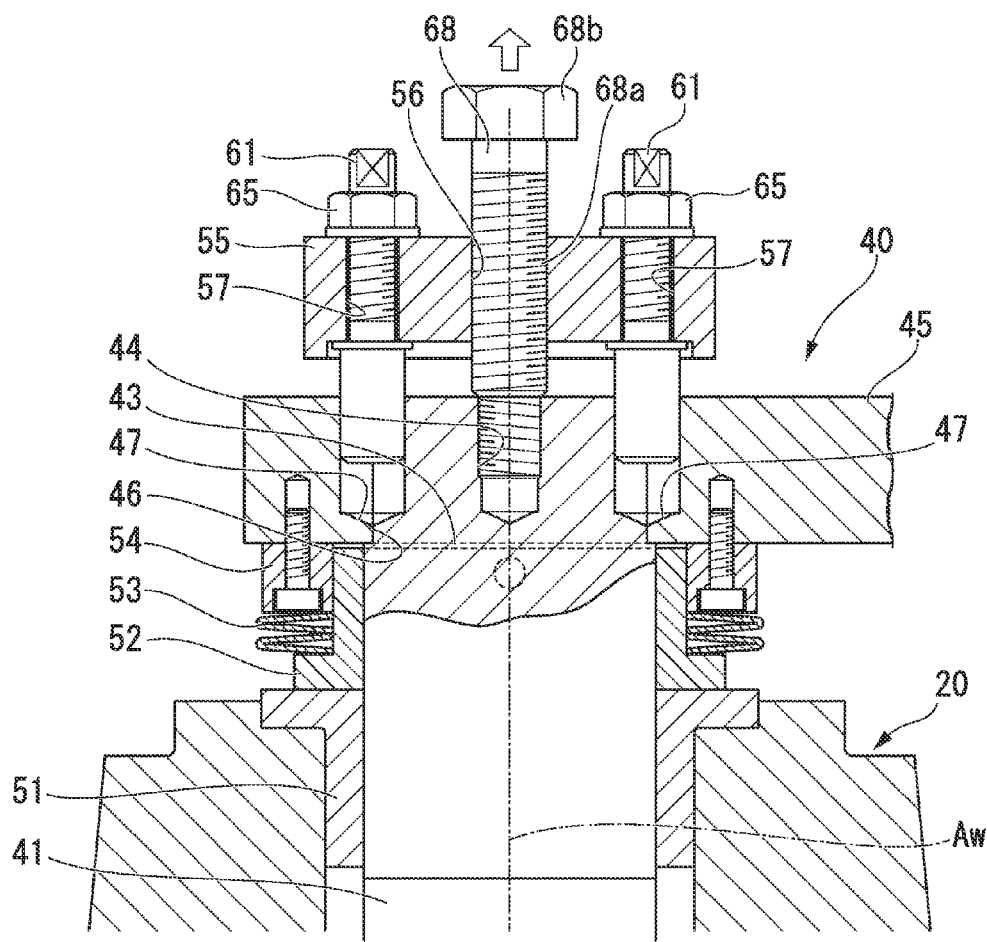
FIG. 9B is a cross-sectional view of the link mechanism in the state shown in FIG. 9A.

After that, further, as shown in FIGS. 9A and 9B, the removing bolt 68 is threaded into the pin removing thread hole 56 of the pin support member 55. As described above, the removing bolt 68 cannot enter the pin pushing thread hole 44 of the first link piece 45. For this reason, the removing bolt 68 maintains a state in which the front end is in contact with the surface of the first link piece 45, and increases a projection amount from the pin support member 55. In other words, the front end of the removing bolt 68 moves away from a lower surface of the pin support member 55 (a surface of the first link piece 45 side). As a result, the pin support member 55 with which the removing bolt 68 is thread-engaged as well as the detent pin 61 fixed to the pin support member 55 moves away from the variable vane 16 in the blade axis (Aw) direction, and finally, the detent pin 61 is removed from the pin hole 47. Then, the first link piece 45 is separated from the blade rotating shaft 41.

Thus a removal operation of the first link piece 45 is terminated.

Next, the spring 53 is separated from the rotary shaft side bush 52, and the rotary shaft side bush 52 is separated from the blade rotating shaft 41. Thus a disassembly operation of the link mechanism 40 is terminated.

As described above, in this embodiment, since an insertion and removing direction of the detent pin 61 is the blade axis (Aw) direction, i.e., a direction in which the blade rotating shaft 41 extends, and an attachment and removal direction of the first link piece 45 with respect to the blade rotating shaft 41, an insertion and removing operation of the detent pin 61 can be performed in a space in which a working space for the attachment and removal of the first link piece 45 is secured. For this reason, in this embodiment, during the insertion and removing operation of the detent pin 61 in the link mechanism 40, the operation can be performed without interference with the other link mechanisms 40 adjacent in the circumferential direction with reference to the rotor main body 11. Accordingly, according to the embodiment, a working space sufficient for the insertion and removing operation of the detent pin 61 can be secured.

In addition, in this embodiment, the detent pin 61 can be fitted into the pin hole 47 by threading the pushing bolt 66. Further, in this embodiment, as the removing bolt 68 is threaded into the pin support member 55, the detent pin 61 can be removed from the pin hole 47 without using a jack or the like. Accordingly, according to the embodiment, the insertion and removing operation of the detent pin 61 with respect to the pin hole 47 can be easily performed.

Accordingly, in this embodiment, the assembly and disassembly operation of the link mechanism 40 can be easily performed in a short period of time.

In addition, in this embodiment, since the pin hole 47 is formed in a direction parallel to the blade rotating shaft 41, when the thickness of the first link piece 45 is increased and the depth of the pin hole 47 is increased, a contact area of the detent pin 61 with the blade rotating shaft 41 and the first link piece 45 can be easily increased. For this reason, in this embodiment, even when a large rotational torque is applied to the first link piece 45, damage to the detent pin 61 can be prevented.

In addition, while the link mechanism 40 of the above-mentioned embodiment has the two detent pins 61, the link mechanism 40 may have three or more detent pins 61. Even in this case, similar to the above-mentioned embodiment, the respective detent pins 61 is preferably fixed to the pin support member 55 on the circumference around the blade rotating shaft 41 in the circumferential direction at regular intervals.

Further, while the link mechanism 40 of the above-mentioned embodiment constitutes a portion of the variable vane drive device of the axial-flow fluid machine, the present invention is not limited thereto but the link mechanism 40 may constitute a portion of another apparatus.

INDUSTRIAL APPLICABILITY

The present invention provides a link mechanism configured to rotate a second member around an axis of the second member according to movement of a first member, the link mechanism including: a rotary shaft formed in a cylindrical shape around the axis and having a distal end fixed to the second member and a pin pushing thread hole recessed from the proximal end to the distal end in a direction parallel to the axis; a link member having a shaft insertion hole through which the proximal end of the rotary shaft can be inserted in a direction parallel to the axis; a detent pin configured to restrict the link member with respect to the proximal end of the rotary shaft to be relatively non-rotatable around the axis;

a pin support member to which the detent pin is fixed; and a pushing bolt having a male thread section that can be thread-engaged with the pin pushing thread hole of the rotary shaft, wherein a pin hole formed through the proximal end of the rotary shaft and the link member, recessed toward the distal end in a direction parallel to the axis, and into which the detent pin can be fitted, is formed at the proximal end of the rotary shaft and the link member into which the proximal end is inserted, a pin removing thread hole passing in a direction in which the detent pin fixed to the pin support member extends, and concentric with the pin pushing thread hole of the rotary shaft when the detent pin is fitted into the pin hole, is formed in the pin support member, and a thread major diameter of the pin removing thread hole is larger than a thread major diameter of the male thread section of the pushing bolt, and smaller than an outer diameter of a bolt head section of the pushing bolt.

According to the present invention, a working space sufficient for insertion and removing of the detent pin can be secured, and the insertion and removing operation of the detent pin with respect to the pin hole can be easily performed. Accordingly, an assembly and disassembly operation can be easily performed in a short period of time.

DESCRIPTION OF REFERENCE NUMERALS

C: AXIAL-FLOW COMPRESSOR (AXIAL-FLOW FLUID MACHINE),
10: ROTOR,
11: ROTOR MAIN BODY,
12: BLADE,
16: VARIABLE VANE (SECOND MEMBER),
20: CASING,
30: VARIABLE VANE DRIVE DEVICE,
31: MOVABLE RING (FIRST MEMBER),
33: RING SUPPORT MECHANISM,
37: ROTARY DRIVE MECHANISM,
40: LINK MECHANISM,
41: BLADE ROTATING SHAFT (ROTARY SHAFT),
42: DISTAL END OF BLADE ROTATING SHAFT,
43: THE PROXIMAL END OF BLADE ROTATING SHAFT,
44: PIN PUSHING THREAD HOLE,
45: FIRST LINK PIECE (LINK MEMBER),
46: SHAFT INSERTION HOLE,
47: PIN HOLE,
55: PIN SUPPORT MEMBER,
56: PIN REMOVING THREAD HOLE,
57: PIN ATTACHMENT HOLE,
61: DETENT PIN,
62: MALE THREAD SECTION,
63: FITTING SECTION,
64: COLLAR SECTION,
65: PIN-FIXING NUT,
66: PUSHING BOLT,
66a: MALE THREAD SECTION OF PUSHING BOLT,
66b: BOLT HEAD SECTION OF PUSHING BOLT,
68: REMOVING BOLT,
68a: MALE THREAD SECTION OF REMOVING BOLT,
68b: BOLT HEAD SECTION OF REMOVING BOLT

The invention claimed is:

1. A link mechanism configured to rotate a second member around an axis of the second member in connection with movement of a first member, the link mechanism comprising:
a rotary shaft formed in a cylindrical shape around the axis and having a distal end fixed to the second member and a pin pushing thread hole recessed from a proximal end of the rotary shaft to the distal end in a direction parallel to the axis;
a link member having a shaft insertion hole which passes in a direction parallel to the axis and through which the proximal end of the rotary shaft can be inserted;
a detent pin configured to restrict the link member to be relatively non-rotatable around the axis with respect to the proximal end of the rotary shaft;
a pin support member to which the detent pin is fixed; and
a pushing bolt having a male thread section that can be thread-engaged with the pin pushing thread hole of the rotary shaft,
wherein a pin hole, which is formed from the proximal end of the rotary shaft to the link member, which is recessed toward the distal end in a direction parallel to the axis, and into which the detent pin can be fitted, is formed at the proximal end of the rotary shaft and the link member into which the proximal end is inserted,
a pin removing thread hole passing in a direction in which the detent pin fixed to the pin support member extends, and concentric with the pin pushing thread hole of the rotary shaft when the detent pin is fitted into the pin hole, is formed in the pin support member, and
a thread major diameter of the pin removing thread hole is larger than a thread major diameter of the male thread section of the pushing bolt, and smaller than an outer diameter of a bolt head section of the pushing bolt.

2. The link mechanism according to claim 1, further comprising a removing bolt having a male thread section that can be thread-engaged with the pin removing thread hole.

3. The link mechanism according to claim 1, further comprising a plurality of the detent pins,
wherein the plurality of the detent pins is fixed to the pin support member on a circumference around an axis of the pin removing thread hole in a circumferential direction at regular intervals.

4. The link mechanism according to claim 1, wherein the axis of the pin pushing thread hole is disposed over the axis of the rotary shaft.

5. The link mechanism according to claim 1, wherein a pin attachment hole passing in a penetration direction of the pin removing thread hole is formed in the pin support member, and
the detent pin has a male thread section formed at one end side of the detent pin, a fitting section formed at the other end of the detent pin and fitted into the pin hole, and a collar section formed at a boundary between the male thread section and the fitting section and projecting in a direction perpendicular to an axis of the detent pin.

6. A variable vane drive device of an axial-flow fluid machine including a rotor having a plurality of blades, a casing configured to rotatably cover the rotor, and a plurality of variable vanes disposed around the rotor in the casing in an annular shape, the variable vane drive device comprising:
an annular-shaped movable ring disposed at an outer circumferential side of the casing;
a plurality of ring support mechanisms disposed in a circumferential direction of the movable ring at intervals and configured to rotatably support the movable ring around the rotor;
a rotary drive mechanism configured to rotate the movable ring around the rotor; and
a link mechanism according to any one of claims 1 to 5,
wherein the link mechanism is configured to connect the movable ring to the variable vane such that a direction of the variable vane, which is the second member, is varied according to rotation of the movable ring, which is the first member.

* * * * *